July 19, 1960     A. WATZL ET AL     2,945,788
PROCESS FOR THE PURIFICATION OF DIMETHYLTEREPHTHALATE
Filed Nov. 19, 1956
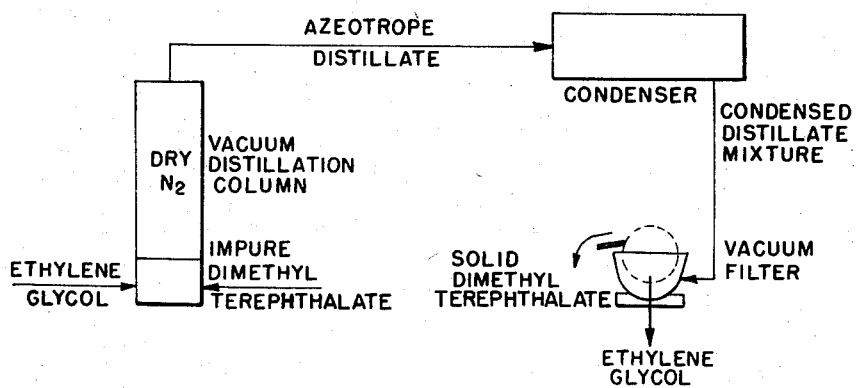
INVENTORS:
ANTON WATZL
ERHARD SIGGEL
BY *Markall, Johnston, Cooke & Root*
ATT'YS

United States Patent Office 2,945,788
Patented July 19, 1960

2,945,788

PROCESS FOR THE PURIFICATION OF DIMETHYLTEREPHTHALATE

Anton Watzl, Kleinwallstadt (Ufr.), and Erhard Siggel, Laudenbach (Main), Germany, assignors to Vereinigte Glanzstoff-Fabriken A.G., Wuppertal-Elberfeld, Germany Filed Nov. 19, 1956, Ser. No. 622,778

4 Claims. (Cl. 202—42)

This invention, in general, relates to production of dimethylterephthalate and more particularly to the purification thereof.

The purification of dimethylterephthalate can be carried out either by distillation or by recrystallization from solvents such as methanol or carbon tetrachloride. With the distillation under atmospheric pressure, an excellent purification cannot be attained because, at the relatively high temperatures, decomposition phenomena are unavoidable, which phenomena, in turn, produce new impurities. The disadvantage with the recrystallization lies in the fact that large amounts of mother liquor accrue—the separation of which is unwieldy and results in considerable losses. It has already been suggested to carry out the distillation of dimethylterephthalate in a continuous process, the material passing through three distillation zones. Also this method of purification is unwieldy on account of the extensive equipment and does not admit an extreme purification, as this is absolutely necessary for the further processing of dimethylterephthalate into corresponding polycondensates.

It is, therefore, an object of the present invention to provide an improved process for purification of dimethylterephthalate.

Another object is to provide a process for purifying crude dimethylterephthalate in a single distillation step to a purity sufficient for utilization thereof in reesterification or in production of polycondensates.

In accordance with the invention, dimethylterephthalate is subjected to extreme purification when the crude dimethylterephthalate in the presence, preferably at least an equal amount by weight, of aliphatic glycols, preferably ethylene glycol, is subjected to a distillation under vacuum. This discovery is surprising because by a distillation with methanol, for instance, no purification in the desired sense is possible. The present process is characterized by the fact that the crude or impure dimethyl ester, which was gained either by depolymerization of polyethyleneterephthalate or by esterification of terephthalic acid, is purified by vacuum distillation in a single step in the overall process. The glycol used for the distillation can be used over again immediately for further distillation, without having it first redistilled. The ethylene glycol is separated from the dimethylterephthalate by sucking off, e.g., by vacuum filtration, the excess glycol from the condensed ethylene glycol-dimethylterephthalate mixture making an intermediate desiccation superfluous and providing a considerable acceleration of the overall process. The dimethyl terephthalate is immediately suitable for reesterification or subsequent polycondensation to polyethylene terephthalate. There are gained polycondensates of high degree of viscosity with K values from 50 to 57.

The best mode contemplated for practicing the invention involves the use of ethylene glycol as the aliphatic glycol. The following is a specific illustration thereof.

*Example*

Thirty grams of crude dimethylterephthalate are mixed in a flask with 270 grams of ethylene glycol and azeotropically distilled with the introduction of dry nitrogen in a column of 30 cm. at about 44 Torr (1 Torr equals 1 mm. Hg). The azeotrope goes over at about 120° C. into a cooled condenser. The dimethylterephthalate separated from the glycol by vacuum filtering can be used immediately for reesterification or for polycondensation. This process is illustrated in the flow sheet of the accompanying drawing.

The invention is hereby claimed as follows:

1. A process for purification of dimethylterephthalate characterized by azeotropic, vacuum distillation at about 44 mm. Hg and about 120° C. of dimethylterephthalate in the presence of ethylene glycol.

2. A process for purification of dimethylterephthalate which comprises distilling under vacuum of about 44 mm. Hg and at about 120° C. from a body of impure dimethylterephthalate and ethylene glycol an azeotrope of dimethylterephthalate and ethylene glycol; condensing the azeotrope; removing the ethylene glycol from the condensed azeotrope.

3. A process for purification of dimethylterephthalate which comprises distilling under vacuum of about 44 mm. Hg and at about 120° C. from a body of impure dimethylterephthalate and ethylene glycol an azeotrope of dimethylterephthalate and ethylene glycol; condensing the azeotrope; and removing the ethylene glycol from the condensed azeotrope; and recovering the purified dimethylterephthalate.

4. A process for purification of impure dimethylterephthalate selected from the group consisting of impure dimethylterephthalate derived by depolymerization of polyethyleneterephthalate and impure dimethylterephthalate derived by esterification by terephthalic acid with methanol comprising distilling under vacuum from a body of said impure dimethylterephthalate and ethylene glycol an azeotrope of dimethylterephthalate and ethylene glycol; condensing the distillate; and separating the ethylene glycol from the dimethylterephthalate in the condensed distillate to obtain substantially pure dimethylterephthalate.

References Cited in the file of this patent

UNITED STATES PATENTS

| | | |
|---|---|---|
| 2,773,090 | Leibu | Dec. 4, 1956 |
| 2,825,737 | Saffer et al. | Mar. 4, 1958 |
| 2,829,155 | Muench et al. | Apr. 1, 1958 |

OTHER REFERENCES

"Azeotropic Data" (Horsley), published by American Chemical Society (Washington, D.C.), 1952 (page 131 relied on).